United States Patent
Fukai et al.

(10) Patent No.: US 9,811,895 B2
(45) Date of Patent: Nov. 7, 2017

(54) EQUIPMENT MANUFACTURE SUPPORTING APPARATUS, EQUIPMENT MANUFACTURE SUPPORTING METHOD, AND STORAGE MEDIUM FOR EQUIPMENT MANUFACTURE SUPPORTING PROGRAM

(71) Applicant: KABUSHIKI KAISHA TOSHIBA, Tokyo (JP)

(72) Inventors: Hisayoshi Fukai, Yokohama (JP); Hidemitsu Hohki, Fuchu (JP); Sachi Minami, Kawasaki (JP); Masashi Nishiyama, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 13 days.

(21) Appl. No.: 14/427,390

(22) PCT Filed: Sep. 5, 2013

(86) PCT No.: PCT/JP2013/073991
§ 371 (c)(1),
(2) Date: Mar. 11, 2015

(87) PCT Pub. No.: WO2014/042078
PCT Pub. Date: Mar. 20, 2014

(65) Prior Publication Data
US 2015/0248752 A1    Sep. 3, 2015

(30) Foreign Application Priority Data
Sep. 11, 2012    (JP) .................................. 2012-199819

(51) Int. Cl.
*G06T 7/00*    (2017.01)
*G05B 19/418*    (2006.01)
(Continued)

(52) U.S. Cl.
CPC ........ *G06T 7/0004* (2013.01); *G05B 19/4188* (2013.01); *G06Q 10/06* (2013.01);
(Continued)

(58) Field of Classification Search
CPC .......... G05B 19/4188; G05B 19/41805; G05B 2219/31395; G05B 2219/31397;
(Continued)

(56) References Cited

U.S. PATENT DOCUMENTS

| 4,894,790 A | * | 1/1990 | Yotsuya | ........... G01N 21/95607 348/126 |
| 6,801,652 B1 | * | 10/2004 | Stanzl | .................. H05K 13/022 382/146 |
| 2012/0050522 A1 | * | 3/2012 | Van Slyck et al. | .... H04N 7/188 348/92 |

FOREIGN PATENT DOCUMENTS

| JP | 2002 65973 | 3/2002 |
| JP | 2002065973 A | * 3/2002 |

(Continued)

OTHER PUBLICATIONS

International Preliminary Report on Patentability and Written Opinion dated Mar. 17, 2015 in PCT/JP2013/073991 (submitting English language translation only).

(Continued)

*Primary Examiner* — Kim Vu
*Assistant Examiner* — Michael Vancy, Jr.
(74) *Attorney, Agent, or Firm* — Oblon, McClelland, Maier & Neustadt, L.L.P.

(57) ABSTRACT

Providing an equipment manufacture supporting technique in which a plurality of departments that cooperate with one another can unify management of components constituting equipment.

An equipment manufacture supporting apparatus including: a component information receiving unit that receives dis- (Continued)

crimination information and image information of each of components constituting equipment; an electronic code giving unit that gives an electronic code corresponding to the discrimination information; a component information registering unit that links and registers mutually connected components; an image receiving unit that receives imaged data of a plurality of components mounted on the equipment; an electronic code recognizing unit that recognizes the electronic codes respectively marked on the plurality of components, from the imaged data; and a connection determining unit that determines whether a connection relation of the plurality of components mounted on the equipment is right or wrong, on a basis of the electronic codes recognized from the imaged data.

15 Claims, 9 Drawing Sheets

(51) Int. Cl.
G06Q 10/06 (2012.01)
G06Q 50/04 (2012.01)

(52) U.S. Cl.
CPC ... *G06Q 50/04* (2013.01); *G05B 2219/31395* (2013.01); *G05B 2219/31397* (2013.01); *G06T 2207/30108* (2013.01); *Y02P 90/04* (2015.11); *Y02P 90/10* (2015.11); *Y02P 90/24* (2015.11); *Y02P 90/30* (2015.11)

(58) Field of Classification Search
CPC ......... G06T 2207/30108; G06T 7/0004; G06T 2207/30164; G06T 7/003; G06T 2207/30141; G06T 7/001; G06T 7/70; Y02P 90/10; Y02P 90/04; Y02P 90/24; Y02P 90/30; H05K 13/08; H05K 13/0486; H05K 13/046; H05K 13/022; H05K 13/0417; Y10T 29/4913; Y10T 29/53087; Y10T 29/53174; Y10T 29/53; Y10T 29/49126; Y10T 29/49133; Y10T 29/49137; Y10T 29/53061; Y10T 29/53091; G01N 2021/95615; G01N 2021/95638; G01N 21/95607; G01R 31/31704; G01R 31/318364; G06K 2209/19; G06K 9/00; G06Q 10/06; G06Q 50/04; H01L 2924/00

See application file for complete search history.

(56) References Cited

FOREIGN PATENT DOCUMENTS

| JP | 2008 90479 | | 4/2008 |
|---|---|---|---|
| JP | 2009 211454 | | 9/2009 |
| JP | 2009211454 A | * | 9/2009 |

OTHER PUBLICATIONS

International Search Report dated Oct. 1, 2013 in PCT/JP13/073991 Filed Sep. 5, 2013.

* cited by examiner

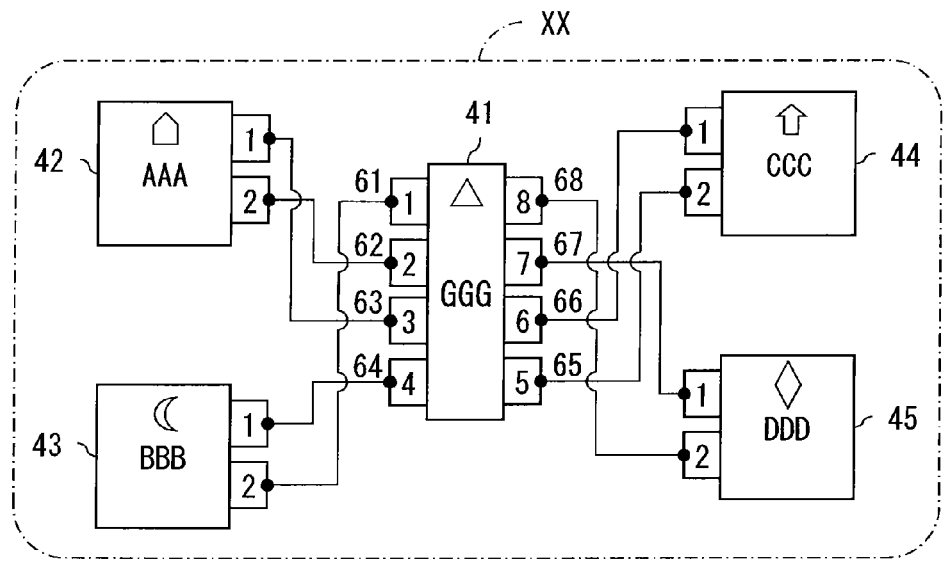

FIG. 2

| CONSTITUENT COMPONENT | | CONNECTION DESTINATION COMPONENT 1 | | CONNECTION DESTINATION COMPONENT 2 | |
|---|---|---|---|---|---|
| DISCRI-MINATION INFOR-MATION | ELECTRONIC CODE | POSI-TION INFOR-MATION | IMAGE INFORMATION | POSI-TION INFOR-MATION | IMAGE INFORMATION |
| CAB-1 | ‖‖‖‖‖‖ | GGG-1 | | BBB-2 | |
| CAB-2 | ‖‖‖‖‖‖ | GGG-2 | | AAA-2 | |
| CAB-3 | ‖‖‖‖‖‖ | GGG-3 | | AAA-1 | |
| CAB-4 | ‖‖‖‖‖‖ | GGG-4 | | BBB-1 | |
| CAB-5 | ‖‖‖‖‖‖ | GGG-5 | | CCC-2 | |
| CAB-6 | ‖‖‖‖‖‖ | GGG-6 | | CCC-1 | |
| CAB-7 | ‖‖‖‖‖‖ | GGG-7 | | DDD-1 | |
| CAB-8 | ‖‖‖‖‖‖ | GGG-8 | | DDD-2 | |

FIG. 3

| CONSTITUENT COMPONENT | | | | CONNECTION DESTINATION COMPONENT | |
|---|---|---|---|---|---|
| DISCRI-MINATION INFOR-MATION | ELECTRO-NIC CODE | POSITION INFOR-MATION | IMAGE INFORMATION | DISCRI-MINATION INFOR-MATION | ELECTRO-NIC CODE |
| GGG |  | GGG-1 | 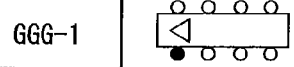 | CAB-1 |  |
| | | GGG-2 | 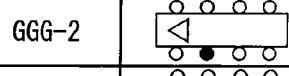 | CAB-2 |  |
| | | GGG-3 | 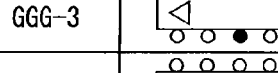 | CAB-3 |  |
| | | GGG-4 | 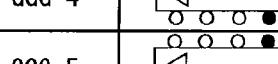 | CAB-4 |  |
| | | GGG-5 |  | CAB-5 |  |
| | | GGG-6 | 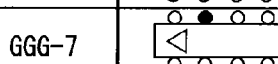 | CAB-6 |  |
| | | GGG-7 |  | CAB-7 |  |
| | | GGG-8 |  | CAB-8 |  |
| AAA |  | AAA-1 | 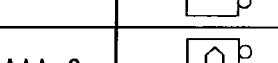 | CAB-3 |  |
| | | AAA-2 | 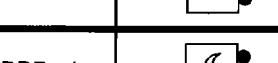 | CAB-2 |  |
| BBB |  | BBB-1 |  | CAB-4 |  |
| | | BBB-2 |  | CAB-1 |  |
| CCC |  | CCC-1 |  | CAB-6 |  |
| | | CCC-2 |  | CAB-5 |  |
| DDD |  | DDD-1 |  | CAB-7 |  |
| | | DDD-2 |  | CAB-8 |  |
FIG. 4

| CONSTITUENT COMPONENT | | CONNECTION DESTINATION COMPONENT 1 | | CONNECTION DESTINATION COMPONENT 2 | |
|---|---|---|---|---|---|
| DISCRIMI-NATION INFOR-MATION | ELECTRONIC CODE | POSI-TION INFOR-MATION | IMAGE INFORMATION | POSI-TION INFOR-MATION | IMAGE INFORMATION |
| ABC-1 | ||||||||| | HHH-1 | | JJJ-1 | |
| ABC-2 | ||||||||| | HHH-2 | | JJJ-2 | |
| DEF-1 | ||||||||| | HHH-3 | | KKK-2 | |
| DEF-2 | ||||||||| | HHH-4 | | KKK-1 | |
| GHI | ||||||||| | KKK-4 | | KKK-3 | |
| MMM | ||||||||| | | | | |

| CONSTITUENT COMPONENT | | | | CONNECTION-DESTINATION COMPONENT | |
|---|---|---|---|---|---|
| DISCRI-MINATION INFOR-MATION | ELECTRO-NIC CODE | POSITION INFORMATION | IMAGE INFORMATION | POSITION INFORMATION | ELECTRO-NIC CODE |
| HHH |  | HHH-1 |  | ABC-1 |  |
| | | HHH-2 |  | ABC-2 |  |
| | | HHH-3 |  | DEF-1 |  |
| | | HHH-4 |  | DEF-2 |  |
| JJJ |  | JJJ-1 |  | ABC-1 |  |
| | | JJJ-2 |  | ABC-2 |  |
| KKK |  | KKK-1 |  | DEF-2 |  |
| | | KKK-2 |  | DEF-1 |  |
| | | KKK-3 |  | GHI |  |
| | | KKK-4 |  | | |
FIG. 9

| MOUNTING REGION | COMPONENT INFORMATION | SUPPLIER | MODEL NUMBER | DELIVERY INFORMATION |
|---|---|---|---|---|
| XX | AAA | O× CO.,LTD. | DJU-13287 | 40days |
| | BBB | OO Corp. | KUN-19848 | 5days |
| | CCC | △□ CO.,LTD. | 25-NDJIDK | 10 PIECES |
| | DDD | ×△ CO.,LTD. | ODY-387 | 60days |
| | GGG | □O Corp. | PPP283-2 | 14days |
| | CAB-Z | ∇O Corp. | KJGB-Z | 10days |
| YY | HHH | O× CO.,LTD. | DJU-73628 | 20days |
| | JJJ | O× CO.,LTD. | DJU-25498 | 20days |
| | KKK | O△ CO.,LTD. | TDE-1836 | 25 PIECES |
| | ABC-Z | ∇O Corp. | RVJH-Z | 15days |
| | DEF-Z | O△ CO.,LTD. | TDE-7362 | 25 PIECES |
| | GHI | O△ CO.,LTD. | TDE-5839 | 25 PIECES |

FIG. 10A

| SUPPLIER | SEGMENT | COMPONENT INFORMATION | MODEL NUMBER | DELIVERY INFORMATION |
|---|---|---|---|---|
| O× CO.,LTD. | XX | AAA | DJU-13287 | 40days |
| | YY | HHH | DJU-73628 | 20days |
| | YY | JJJ | DJU-25498 | 20days |
| O△ CO.,LTD. | YY | KKK | TDE-1836 | 25 PIECES |
| | YY | DEF-Z | TDE-7362 | 25 PIECES |
| | YY | GHI | TDE-5839 | 25 PIECES |
| ∇O Corp. | XX | CAB-Z | KJGB-Z | 10days |
| | YY | ABC-Z | RVJH-Z | 15days |

FIG. 10B

EQUIPMENT MANUFACTURE SUPPORTING APPARATUS, EQUIPMENT MANUFACTURE SUPPORTING METHOD, AND STORAGE MEDIUM FOR EQUIPMENT MANUFACTURE SUPPORTING PROGRAM

TECHNICAL FIELD

An embodiment of the present invention relates to an equipment manufacture supporting technique in which an optical detection technique is incorporated into working processes such as design, component procurement, installation, and maintenance.

BACKGROUND ART

In general, when equipment is manufactured, specifications, an arrangement diagram, a connection diagram, an assembly diagram, and other diagrams of instruments provided to the equipment are prepared by a design department, and components are ordered and installed by a procurement department and a construction department, respectively, on the basis of the prepared diagrams. Further, maintenance concerning a quality assurance of the equipment and the instruments is performed by an inspection department using the prepared diagrams.

Under the circumstances, known is an inventory management system in which: bar codes are respectively given to articles; and an inventory state in a storage place of the articles is managed on the basis of bar code information imaged by a camera (for example, Patent Document 1).

PRIOR ART DOCUMENT

Patent Document

Patent Document 1: Japanese Patent Laid-Open No. 2011-150460

SUMMARY OF THE INVENTION

Problems to be Solved by the Invention

Up to now, when equipment is manufactured, each of the design department, the procurement department, the construction department, and the inspection department has created and utilized a management format specific to each department. Cooperation among the departments is based on a human system, and thus is not rational.

According to the known technique in which the bar codes of the articles are imaged by the camera and the articles are managed, it is difficult for a plurality of departments such as the design department, the procurement department, the construction department, and the inspection department to unify management of the articles across the departments.

The present invention, which has been made in view of the above-mentioned circumstances, has an object to provide an equipment manufacture supporting technique in which a plurality of departments that cooperate with one another can unify management of components constituting equipment.

BRIEF DESCRIPTION OF THE DRAWINGS

FIG. 2 is a design diagram illustrating a first embodiment of a connection state of components constituting equipment.

FIG. 3 is a list in which mutually connected components are linked in the first embodiment.

FIG. 4 is a list in which the mutually connected components are linked in the first embodiment.

FIG. 9 is a list in which the mutually connected components are linked in the second embodiment.

FIG. 10A and FIG. 10B are arrangement lists for procurement of the components constituting the equipment in the second embodiment.

DESCRIPTION OF EMBODIMENTS (First Embodiment)

Hereinafter, embodiments of the present invention are described with reference to the attached drawings.

Figure 1:
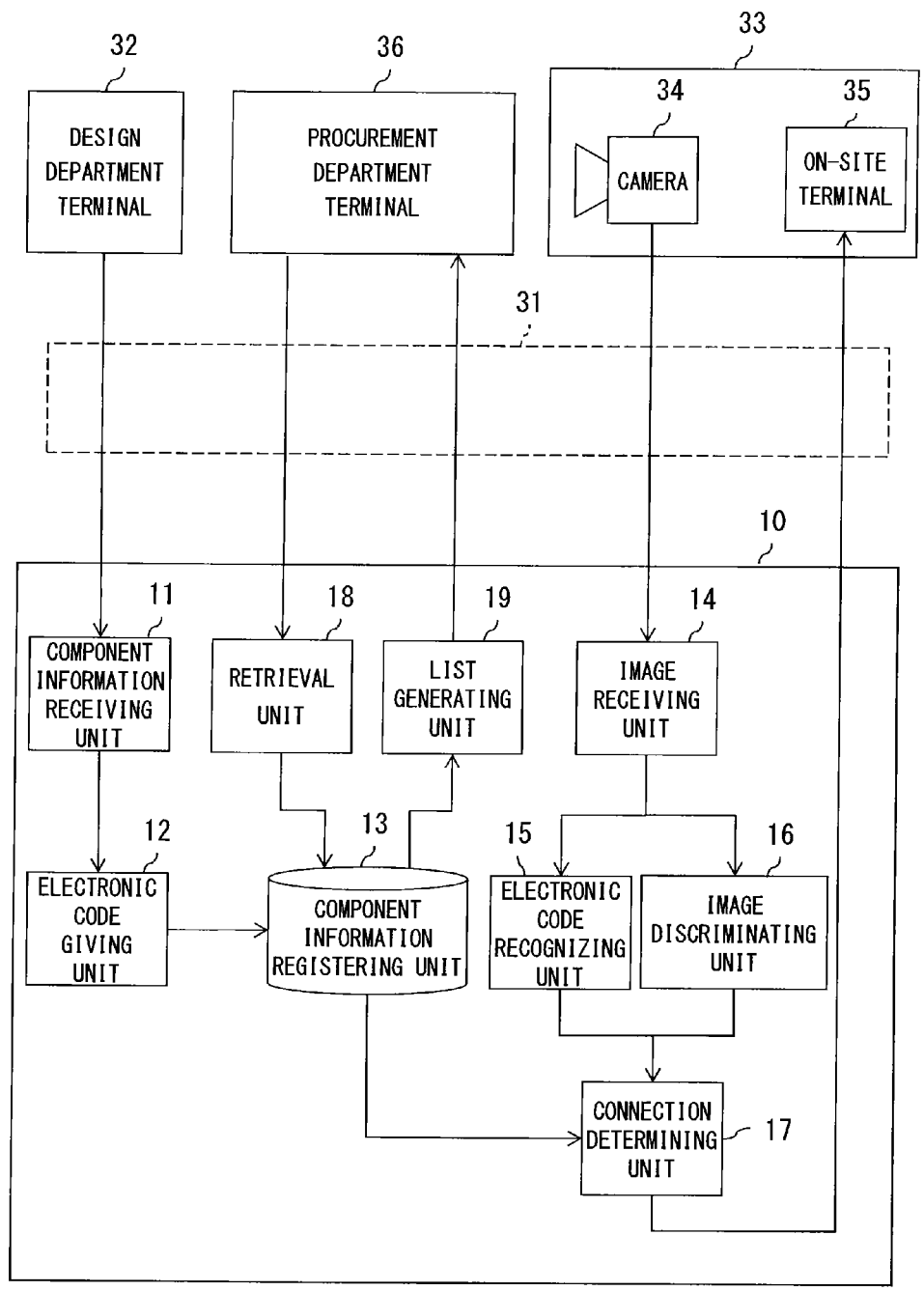
FIG. 1 is a block diagram illustrating an embodiment of an equipment manufacture supporting apparatus according to the present invention.

As illustrated in FIG. 1, an equipment manufacture supporting apparatus 10 (hereinafter, simply referred to as "apparatus 10") according to a first embodiment includes: a component information receiving unit 11 that receives discrimination information and image information (see FIG. 4) of each of components constituting equipment; an electronic code giving unit 12 that gives an electronic code (see FIG. 4) corresponding to the discrimination information; a component information registering unit 13 that links and registers mutually connected components; an image receiving unit 14 that receives imaged data (see FIG. 5B) of a plurality of components mounted on the equipment; an electronic code recognizing unit 15 that recognizes the electronic codes respectively marked on the plurality of components, from the imaged data; and a connection determining unit 17 that determines whether a connection relation of the plurality of components mounted on the equipment is right or wrong, on the basis of the electronic codes recognized from the imaged data.

Here, the equipment refers to instruments attached to buildings, various plants, and large-scale vehicles the insides of which a human enters for use. The components constituting such equipment are not detached in normal use, but can be replaced and repaired at the time of a breakdown or a periodic inspection, because the components are fixed by screwing or the like.

FIG. 2 is a design diagram illustrating a connection state of a plurality of components 41, 42, 43, 44, 45, and 61 to 68 constituting the equipment. The component 41 is a terminal mount, and mutually connects the components 42, 43, 44, and 45 through the cable components 61 to 68 connected to the component 41.

FIG. 3 illustrates a list of the components 41 to 45 as connection destinations of the cable components 61 to 68 (FIG. 2). FIG. 4 illustrates a list of the cable components 61 to 68 as connection destinations of the components 41 to 45 (FIG. 2).

In FIG. 3 and FIG. 4, pieces of discrimination information CAB-n (n=1 to 8) for enabling discrimination by a human are respectively given to the cable components 61 to 68, and pieces of discrimination information GGG, AAA, BBB, CCC, and DDD therefor are respectively given to the components 41 to 45.

In the lists (FIG. 3 and FIG. 4), image information is linked to the discrimination information of each of the components 41 to 45, and the image information is also linked to position information of a terminal to which each of the cable components 61 to 68 is connected.

The component information receiving unit 11 illustrated in FIG. 1 receives component information created by a design department terminal 32 via a network 31.

The design department creates the design diagram (FIG. 2) illustrating the connection state of the components, and also creates the component information containing a connection relation of the components.

As illustrated in FIG. 3 and FIG. 4, the component information contains: discrimination information for enabling a human to discriminate each of the various components 41, 42, 43, 44, 45, and 61 to 68; an electronic code corresponding to the discrimination information, for enabling a machine to discriminate each of the various components 41, 42, 43, 44, 45, and 61 to 68; discrimination information of another component as a connection destination; position information of a portion to which the another component is connected; and image information for enabling discrimination of each of the various components 41, 42, 43, 44, and 45 that are constituent elements, from imaged data of a mounting region XX of the various components.

Position information of a portion in which components are connected to each other is linked to a portion of image information corresponding to the position information, but such a link may not be necessary in a case where the number of connected components is one, for example.

Figure 5A:
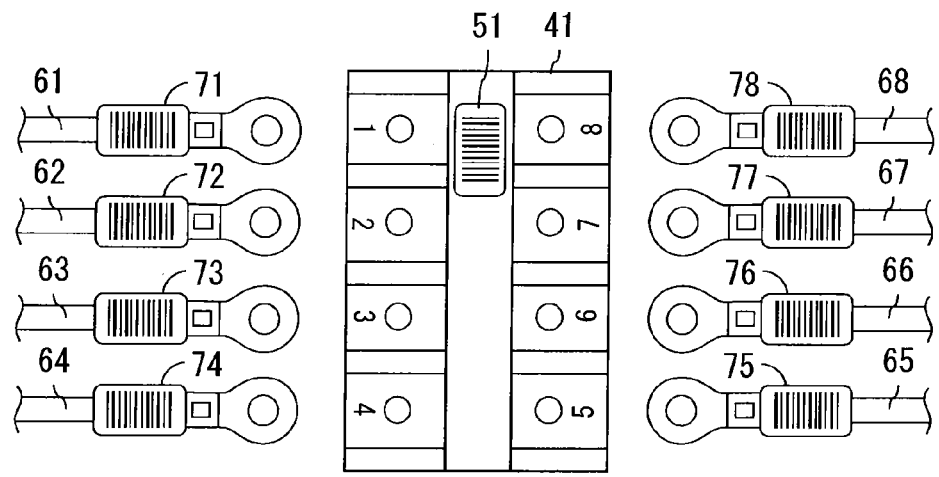
FIG. 5A is an assembly diagram of the mutually connected components in the first embodiment.

Among these, the electronic codes are given by the electronic code giving unit 12 so as to respectively correspond to the pieces of discrimination information. As illustrated in FIG. 5A, the electronic codes are marked on the components 41 and 61 to 68, as code symbols 51 and 71 to 78 respectively corresponding to the components 41 and 61 to 68.

A method of marking the electronic codes on the components is not limited to the illustrated code symbols. Alternatively, the electronic codes may be marked as markers, colors, or character strings.

The component information registering unit 13 registers the component information inputted from the design department terminal 32 on the network 31, in association with the electronic code given thereto. In response to browse requests from terminals 32, 35, and 36 on the network 31, the component information registering unit 13 links and supplies: the component information (the discrimination information, the electronic code, or the position information) of a component to be browsed; and the component information (the discrimination information, the electronic code, or the position information) of another component connected to the component to be browsed.

The image receiving unit 14 receives imaged data of mounted components that is imaged by a camera 34 at an equipment site 33, via the network 31.

Figure 5B:
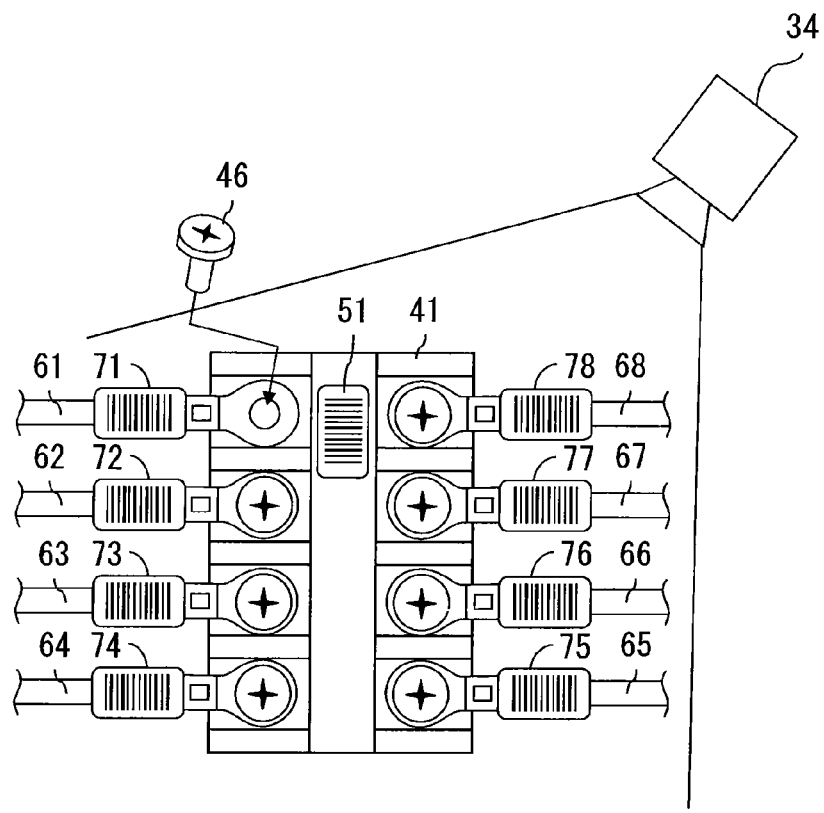
FIG. 5B is an explanatory diagram of imaging of mounted components.

FIG. 5B is a diagram in which the camera 34 images a state where the cable components 61 to 68 are connected to corresponding terminals of the mounted component 41 (terminal mount) by retaining screws 46.

In addition to the case as illustrated in FIG. 5B where the particular component 41 (terminal mount) is zoomed and imaged, the camera 34 may image the entire mounting region XX (see FIG. 2) of the various components.

The electronic code recognizing unit 15 (FIG. 1) recognizes the electronic codes of the code symbols 51 and 71 to 78 respectively marked on the plurality of components 41 and 61 to 68, the electronic codes being included in the imaged data (FIG. 5B).

An image discriminating unit 16 discriminates each component included in the imaged data (FIG. 5B or FIG. 2), as shape data.

The connection determining unit 17 compares the pieces of shape data discriminated by the image discriminating unit 16 and the electronic codes recognized by the electronic code recognizing unit 15, with the pieces of component information registered in the component information registering unit 13, and determines whether the connection relation of the plurality of components mounted on the equipment is right or wrong.

A determination result concerning whether the connection relation of the components is right or wrong is displayed on the on-site terminal 35 at the equipment site 33 via the network 31.

The connection determining unit 17 can also determine whether or not the retaining screws 46 (FIG. 5B) are attached, from the imaged data used by the image discriminating unit 16.

Figure 6:
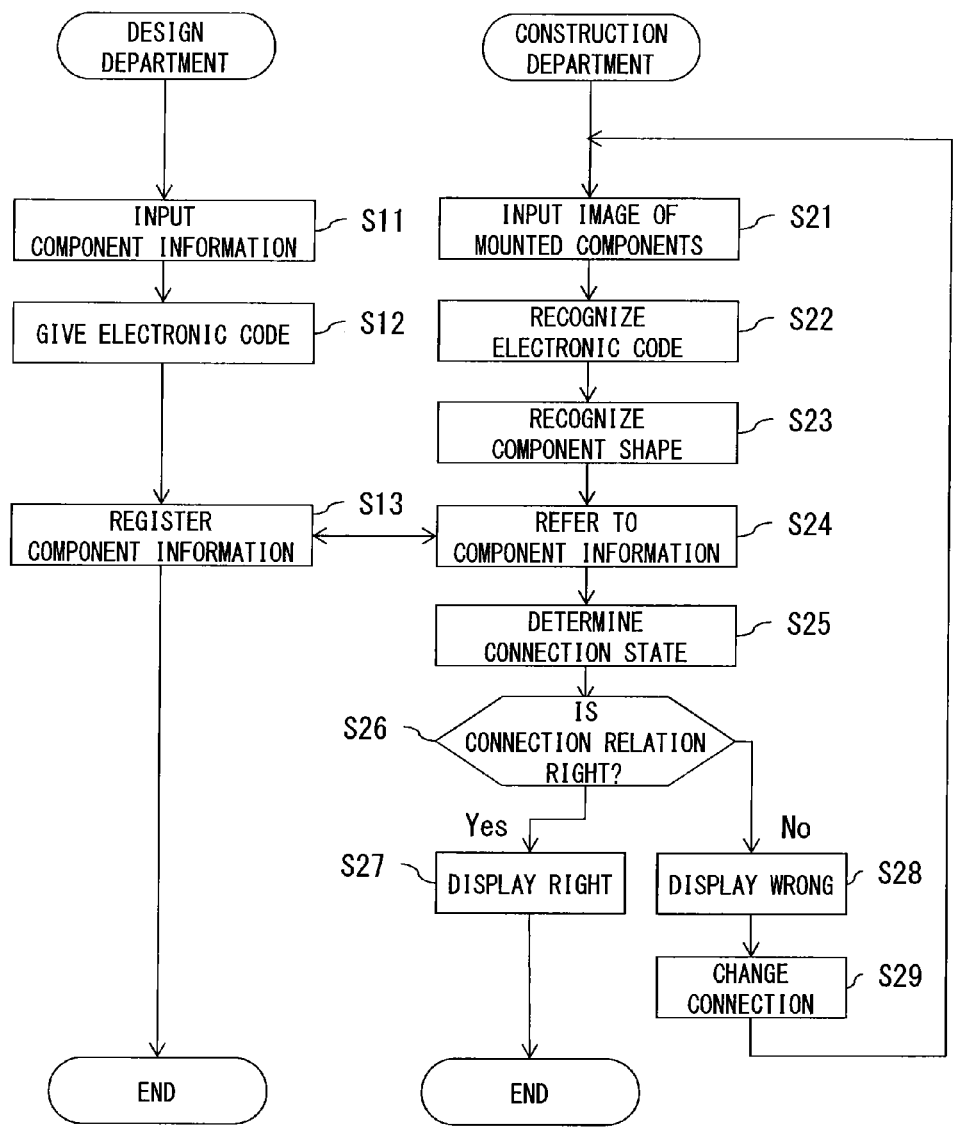
FIG. 6 is a flowchart for describing an equipment manufacture supporting method in the first embodiment.

An equipment manufacture supporting method in the first embodiment concerning modeled procedures from manufacture of a control panel to on-site installation thereof is described with reference to a flowchart of FIG. 6.

When the control panel is manufactured, the design department prepares the design diagram (FIG. 2) illustrating the connection relation of the components constituting the equipment, using a special tool such as CAD from basic data accumulated in a database on the basis of specifications (not illustrated) from a customer.

Further, the design department inputs, from the terminal 32, the component information such as the discrimination information and the image information of each constituent component illustrated in the design diagram (S11).

Data of the component information inputted from the terminal 32 is received by the apparatus 10 via the network 31, and a corresponding electronic code is given to the component information (S12). The component information to which the electronic code is given is registered in the component information registering unit 13 in a state where mutually connected components are linked to each other according to the connection relation of the constituent components illustrated in the design diagram (FIG. 2) (S13).

After the electronic code is given to the received component information, a code symbol corresponding to the electronic code can be marked and reflected on each component in the design diagram (FIG. 2).

The construction department automatically creates an assembly diagram (not illustrated) in which the code symbols are given for each constituent component, on the basis of the data registered in the component information registering unit 13. Meanwhile, as illustrated in FIG. 5A, the code symbols 51 and 71 to 78 are respectively given to the mounted components 41 and 61 to 68. Accordingly, when the equipment is installed on site, a worker can compare and check the code symbols in the assembly diagram and the code symbols of the mounted components by reading with a scanner or the like (not illustrated), and hence an attachment error can be prevented.

Mutually connected mounted components do not necessarily need to be associated one-to-one with each other by electrically readable code symbols, and may be associated with each other by human-readable code symbols.

In connection inspection work after the equipment is installed on site, the plurality of components mounted on the equipment are imaged by the camera 34 as illustrated in FIG. 5B, and the imaged data is inputted to the apparatus 10 via the network 31 (S21).

Then, the electronic code and the shape of each component are recognized from the imaged data (S22, S23), the recognition result is checked with reference to the component information registered in the component information registering unit 13 (S24), and it is determined whether the connection relation of the mounted components is right or wrong (S25).

If the connection relation is right, the inspection work is ended (S26; Yes, S27). If the connection relation is wrong, the connection is changed, and re-inspection is performed (S26; No, S28, S29).

Such inspection work is effective even in periodic component replacement, and facilitates management of an inspection history.

(Second Embodiment)

Next, a second embodiment of the present invention is described with reference to FIG. 1 and FIG. 7 to FIG. 11.

Figures 7, 8:
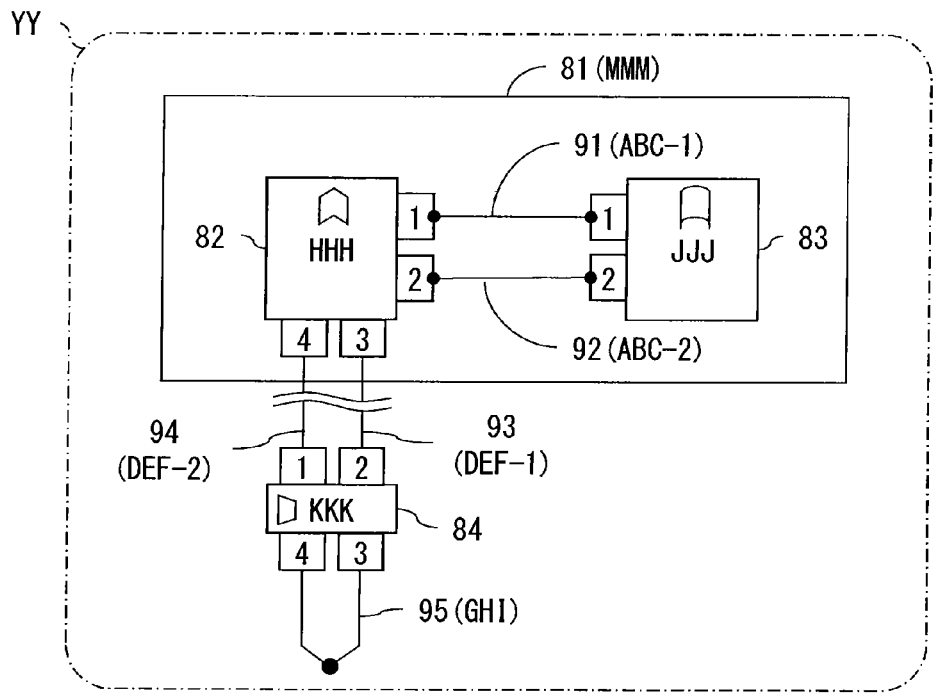
FIG. 7 is a design diagram illustrating a second embodiment of a connection state of components constituting equipment.
FIG. 8 is a list in which mutually connected components are linked in the second embodiment.

FIG. 7 illustrates a mounting region YY of components relating to a thermometer, as an example instrumentation system that controls a plant or the like.

Components illustrated in the mounting region YY include: a thermocouple 95 that is a temperature sensor; compensating lead wires 93 and 94; a connector 84 for the thermocouple 95 and the compensating lead wires 93 and 94; and a thermoelectromotive detector 82 and a temperature signal converter 83 fixed to a substrate 81.

FIG. 8 illustrates a list of the components 82, 83, and 84 as connection destinations of cable components 91 and 92, the compensating lead wires 93 and 94, the thermocouple 95, and the substrate 81 as constituent components. FIG. 9 illustrates a list of the cable components 91 and 92 and the like as connection destinations of the components 82, 83, and 84 as constituent components including connection terminals.

In FIG. 8 and FIG. 9, pieces of discrimination information ABC-n (n=1, 2) are respectively given to the cable components 91 and 92, pieces of discrimination information DEF-n (n=1, 2) are respectively given to the components 93 and 94, and pieces of discrimination information GHI, MMM, HHH, JJJ, and KKK are respectively given to the components 95, 81, 82, 83, and 84.

In the lists (FIG. 8 and FIG. 9), image information is linked to the discrimination information of each of the components 82, 83, and 84. The image information is also linked to position information of a portion of a component to which each of the cable components 91 and 92, the compensating lead wires 93 and 94, and the thermocouple 95 is connected.

In the second embodiment, as illustrated in FIG. 10A, the component information registering unit 13 (FIG. 1) registers supply information such as a supplier, a model number, and delivery information with a link to the component information.

Further, in the second embodiment, the apparatus 10 includes: a retrieval unit 18 that retrieves information registered in the component information registering unit 13; and a list generating unit 19 that generates a list in which the supply information or the discrimination information of each component is arranged in association with the information retrieved from the component information registering unit 13.

For example, as illustrated in FIG. 10B, if the retrieval unit 18 retrieves information registered in the component information registering unit 13 using a supplier as a key, component information and other pieces of supply information linked to the retrieved information can be rearranged.

Then, the list generating unit 19 generates a list in which component information and/or supply information is displayed in a predetermined format in association with the retrieved information (supplier).

Figure 11:
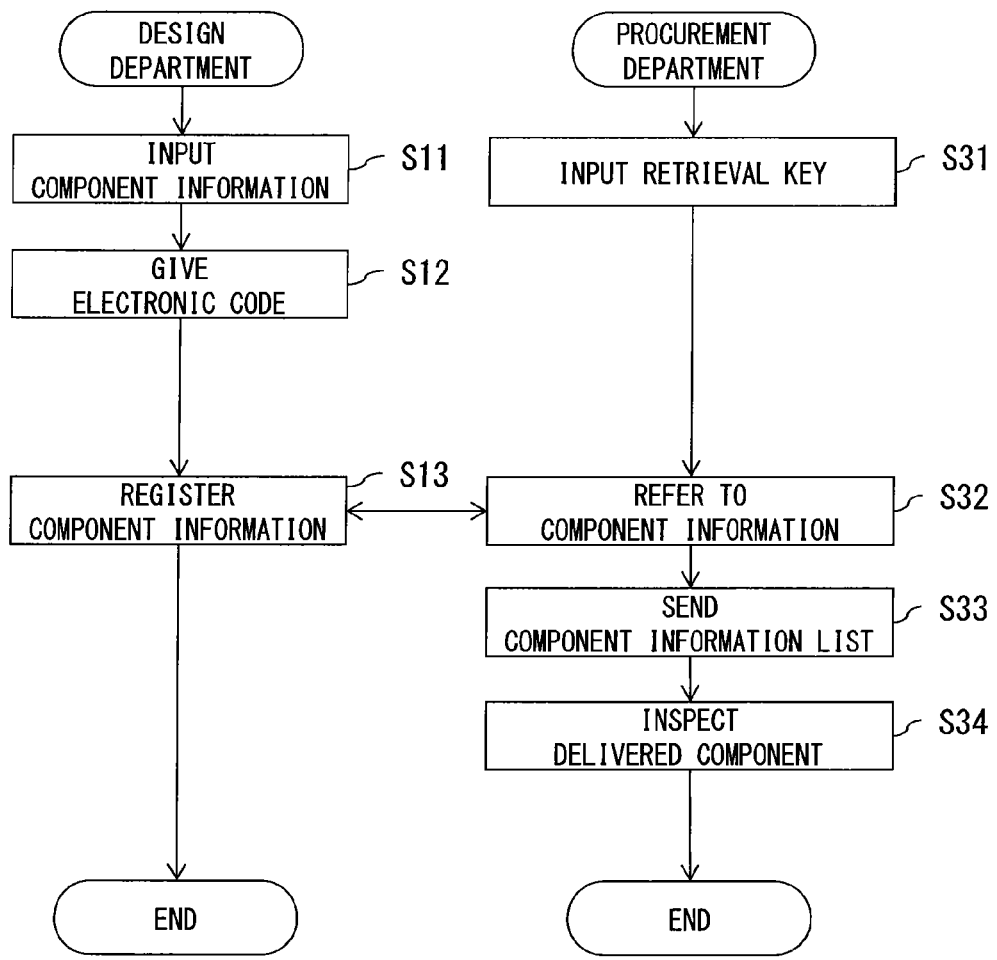
FIG. 11 is a flowchart for describing an equipment manufacture supporting method in the second embodiment.

An equipment manufacture supporting method in the second embodiment concerning modeled procedures by the procurement department based on component information created by the design department is described with reference to a flowchart of FIG. 11. Here, a flow (S11 to S13) for the design department in FIG. 11 is the same as the corresponding flow in FIG. 6, and hence redundant description thereof is omitted.

When a component is ordered, the procurement department inputs "supplier" as a retrieval key to the terminal 36 (S31). Data of the retrieval key is received by the apparatus 10 via the network 31, and is referred to by the component information registering unit 13 (S32). Consequently, a component information list is generated in a predetermined format, necessary information (the number of orders) is added to the component information list, and the component information list is sent to the supplier. In this way, ordering work is ended (S33).

When the component is delivered from the supplier, inspection work can be efficiently performed (S34). This is because the code symbols 51 and 71 to 78 (FIG. 5A) are given for each component.

According to the equipment manufacture supporting apparatus of at least one embodiment described above, because the code symbols are respectively given to the components constituting the equipment, it can be easily and accurately determined whether the connection relation of the components is right or wrong, on the basis of the discrimination information and the shape data of each component that are recognized from the imaged data of the component. Further, it is possible to unify management of wide-ranging manufacturing processes including equipment design, component procurement, component delivery, component installation, and maintenance.

Some embodiments of the present invention have been described above, but these embodiments are given as mere examples and are not intended to limit the scope of the present invention. These embodiments can be carried out in various other modes, and can be variously omitted, replaced, changed, and combined within a range not departing from the gist of the present invention. These embodiments and modifications thereof are included in the scope and gist of the present invention, and are also included in the invention described in WHAT IS CLAIMED IS and a range equivalent thereto.

Constituent elements of the equipment manufacture supporting apparatus can be achieved by a processor of a computer, and can be operated by an equipment manufacture supporting program.

The invention claimed is:

1. An equipment manufacture supporting apparatus comprising:
    component information receiving means for receiving discrimination information and shape information of each of components constituting equipment, the discrimination information and the shape information being described in a design diagram illustrating a connection relation of one of the components;

electronic code giving means for generating an electronic code corresponding to the discrimination information, each electronic code being configured to be attached on one of the components, respectively;

component information registering means for registering component information, the component information being linked to the components, that are mutually connected, with the electronic code and the shape information according to the connection relation of the component illustrated in the design diagram;

an image receiving means for receiving imaged data of a plurality of components of the equipment;

an electronic code recognizing means for recognizing at least one of the electronic codes marked on the respective components in the imaged data;

a shape recognizing means for recognizing a shape of at least one of the components included in the imaged data; and a connection determining means for determining whether the plurality of components of the equipment are properly connected, by matching the electronic codes recognized in the electronic code recognizing means and the shape of the component recognized in the shape recognizing means with the component information registered at the component information registering means.

2. The equipment manufacture supporting apparatus according to claim 1, wherein the electronic code recognizing means recognizes at least two of the electronic codes marked on two components in the imaged data;

the shape recognizing means recognizes a shape of each of the two components; and the connection determining means determines whether the two components of the equipment are properly connected, by matching the two electronic codes recognized in the electronic code recognizing means and the two shapes of the two components recognized in the shape recognizing means with the component information registered at the component information registering means.

3. The equipment manufacture supporting apparatus according to claim 2, wherein the connection determining means determines whether a fastener connecting the two components of the equipment is present.

4. An equipment manufacture supporting apparatus according to claim 1, wherein the component information registering means registers supply information of each component with a link to the discrimination information, the supply information including a supplier, a model number, and delivery information.

5. An equipment manufacture supporting apparatus according to claim 4, comprising means for sending a number of orders of the component to the supplier accordance with the supply information.

6. An equipment manufacture supporting method comprising the steps of:

receiving discrimination information and shape information of each of components constituting equipment, the discrimination information and the shape information being described in a design diagram illustrating a connection relation of one of the components;

generating an electronic code corresponding to the discrimination information, each electronic code being configured to be attached to one of the components, respectively;

registering component information, the component information being linked to the components that are mutually connected with the electronic code and the shape information according to the connection relation of the component illustrated in the design diagram;

receiving imaged data of a plurality of components of the equipment;

recognizing at least one of the electronic codes marked on the respective components in the imaged data and a shape of at least one of the components included in the imaged data; and determining whether the plurality of components of the equipment are properly connected, by matching the electronic codes and the shape of the component, both of that are recognized, with the component information.

7. The equipment manufacture supporting method according to claim 6, comprising:

recognizing at least two of the electronic codes marked on two components in the imaged data;

recognizing a shape of each of the two components; and determining whether the two components of the equipment are properly connected, by matching the two electronic codes and the two shapes with the component information.

8. The equipment manufacture supporting method according to claim 7, comprising:

determining whether a fastener connecting the two components of the equipment is present.

9. The equipment manufacture supporting method according to claim 6, comprising:

determining that the connection is improper;

changing the connection; and re-determining whether the plurality of components of the equipment are properly connected.

10. An equipment manufacture supporting apparatus comprising:

a component information interface that receives discrimination information and shape information of each of components constituting equipment, the discrimination information and the shape information being described in a design diagram illustrating a connection relation of one of the components;

an electronic code generator that generates an electronic code corresponding to the discrimination information, each electronic code being configured to be attached to one of the components, respectively;

a component information memory that registers component information, the component information being linked to the components, that are mutually connected, with the electronic code and the shape information according to the connection relation of the component illustrated in the design diagram;

an image receiving interface that receives imaged data of a plurality of components of the equipment;

an electronic code recognizing circuit configured to recognize at least one of the electronic codes marked on the respective component in the imaged data;

a shape recognizing circuit configured to recognize at least one shape of the component included in the imaged data; and a connection determining circuit that determines whether the plurality of components of the equipment are properly connected, by matching the electronic codes recognized in the electronic code recognizing circuit and the shape of the component recognized in the shape recognizing circuit with the component information registered at the component information memory.

11. The equipment manufacture supporting apparatus according to claim 10, wherein
the component information interface is configured to receive connecting position information, the connecting position information including a connecting portion of at least one of the components linked to a respective portion of the shape information, and
the component information memory is configured to register the mutually connected components with a link to the connecting position information.

12. The equipment manufacture supporting apparatus according to claim 10, wherein
the component information memory is configured to register supply information of each component with a link to the discrimination information of the component, and
the equipment manufacture supporting apparatus further comprises:
a retrieval circuit configured to retrieve information in the component information memory; and
a list generating circuit configured to generate a list including at least one of the supply information or the discrimination information of at least one of the components retrieved with the retrieval circuit.

13. The equipment manufacture supporting apparatus according to claim 10, wherein the electronic codes comprise at least one of code symbols, markers, colors, or character strings.

14. The equipment manufacture supporting apparatus according to claim 10, wherein
the electronic code recognizing circuit is configured to recognize at least two of the electronic codes marked on two components in the imaged data;
the shape recognizing circuit is configured to recognize a shape of each of the two components; and
the connection determining circuit is configured to determine whether the two components of the equipment are properly connected, by matching the two electronic codes recognized in the electronic code recognizing means and the two shapes of the two components recognized in the shape recognizing means with the component information registered at the component information registering means.

15. The equipment manufacture supporting apparatus according to claim 10, wherein the connection determining circuit is configured to determine whether a fastener connecting the two components of the equipment is present.

* * * * *